(12) United States Patent
Patrick

(10) Patent No.: US 7,337,319 B2
(45) Date of Patent: Feb. 26, 2008

(54) METHOD OF COMPARING DOCUMENTS POSSESSED BY TWO PARTIES

(75) Inventor: Kyle Nathan Patrick, Maple Ridge (CA)

(73) Assignee: International Business Machines Corporation, Armonk, NY (US)

(*) Notice: Subject to any disclaimer, the term of this patent is extended or adjusted under 35 U.S.C. 154(b) by 927 days.

(21) Appl. No.: 10/621,731

(22) Filed: Jul. 17, 2003

(65) Prior Publication Data

US 2004/0111617 A1 Jun. 10, 2004

(30) Foreign Application Priority Data

Dec. 6, 2002 (CA) .................................. 2413690

(51) Int. Cl.
H04L 9/00 (2006.01)
(52) U.S. Cl. .................... 713/168; 713/169; 713/176
(58) Field of Classification Search ................ 713/168
See application file for complete search history.

(56) References Cited

U.S. PATENT DOCUMENTS

| | | | |
|---|---|---|---|
| 5,651,069 A | 7/1997 | Rogaway ................. | 380/28 |
| 5,790,669 A | 8/1998 | Miller et al. ............. | 380/25 |
| 6,167,521 A | 12/2000 | Smith et al. ............. | 713/200 |
| 6,681,017 B1 * | 1/2004 | Matias et al. ........... | 380/277 |
| 2001/0044895 A1 * | 11/2001 | Hada ....................... | 713/168 |
| 2002/0049601 A1 * | 4/2002 | Asokan et al. .......... | 705/1 |
| 2003/0093680 A1 * | 5/2003 | Astley et al. ............ | 713/183 |

FOREIGN PATENT DOCUMENTS

| | | |
|---|---|---|
| JP | 11234259 | 8/1999 |
| JP | 11234263 | 8/1999 |
| WO | WO00/48358 | 8/2000 |
| WO | WO00/65426 | 11/2000 |

OTHER PUBLICATIONS

Menezes, et al., "Handbook of Applied Cryptography", 1997, CRC Press, pp. 352-359, 397-417.*
Brassard et al., "Computationally Convincing Proofs of Knowledge", Lecture Notes In Computer Science, 1991.*
Feige et al., "Zero Knowledge Proofs of Knowledge in Two Rounds", Proceedings on Advances in Cryptology, 1989, pp. 526-544.*

(Continued)

Primary Examiner—Gilberto Barrón
Assistant Examiner—Minh Dinh
(74) Attorney, Agent, or Firm—Schmeiser, Olsen & Watts; William H. Steinberg

(57) ABSTRACT

Prior zero-knowledge protocols are used for exchanging secret keys, but not for comparing documents. The present invention provides a method of zero-knowledge document comparison between mutually distrustful parties by having each party exchange a set of random data and a shared hash function, applying the hash function to concatenations of the document and the sets of random data, and comparing the hashes.

1 Claim, 2 Drawing Sheets

OTHER PUBLICATIONS

Research Disclosure "A Strong Client-Server Mutual Authentication Scheme", No. 41787 p. 129, Jan. 1999.

Riordan, J. "Access Control for Computers" IBM Patent Application, IBM Docket CH9-2000-0012, Filed Mar. 14, 2001, U.S. Appl. No. 09/808,341.

Abe, M. "Securing 'Encryption + Proof of Knowledge' in the Random Oracle Model" NTT Inf. Sharing Platform Labs.; Nippon Telegraph & Telephone Corp., Conference 2002, Proceedings pp. 277-289.

Peyravian, M. et al. "Hash-Based Encryption System", IBM Corp. Computers & Security vol. 18, No. 4, pp. 345-350, 1999.

Shihng, Y. et al. "Group-Oriented Authentication Mechanism with Key Exchange", Dept. of Inf. Manage, Computer Communications, vol. 21, No. 5, pp. 485-497, May 15, 1998.

Aura, T. "Strategies Against Replay Attacks", Digital Systems Laboratory, Helsinki University of Technology, IEEE, 1997.

Rangan, P. "Trust Requirements and Performance of a Fast Subtransport-Level Protocol for Secure Communication", IEEE Transactions on Software Engineering, vol. 19, No. 2, Feb. 1993.

Maurer, U. et al. "Unconditionally Secure Key Agreement and the Intrinsic Conditional Information", IEEE Transactions on Information Theory, vol. 45, No. 2, Mar. 1999.

Halevi, S. et al. "Public-Key Cryptography and Password Protocols", ACM Transactions on Information and System Security, vol. 2, No. 3, pp. 230-268, Aug. 1999.

Park, S. et al. "Security Protocol for IEEE 802.11 Wireless Local Area Network" Mobile Networks and Application 3, pp. 237-246, 1998.

* cited by examiner

METHOD OF COMPARING DOCUMENTS POSSESSED BY TWO PARTIES

TECHNICAL FIELD

The invention relates to the field of cryptography and more particularly to zero-knowledge methods for comparing documents between two parties.

BACKGROUND ART

A zero-knowledge protocol, as in other types of interactive proofs, is a protocol between two parties in which one party (the prover), tries to prove a fact to the other party (the verifier). The fact is typically secret information such as a password or, in cryptographic applications, the private key of a public key encryption algorithm. In zero-knowledge protocols, the prover can convince the verifier that he is in possession of the secret without revealing the secret itself. In particular, zero-knowledge protocols are cryptographic protocols in which: 1) the verifier cannot learn anything from the protocol—no knowledge is transferred; 2) the prover cannot cheat the verifier and vice versa; and 3) the verifier cannot pretend to be the prover to any third party. Thus in a zero-knowledge protocol, the fact or secret itself, or any other useful information, is not revealed to the other party during the protocol, nor to any eavesdropper. The Fiat-Shamir protocol was the first practical zero-knowledge cryptographic protocol.

Hash functions are commonly used in cryptography. A one-way hash function is a function that takes a variable-length input string and converts it into a fixed-length output string. An example of such a hash function is the SHA-1 function. It is impossible to determine the input string from the hashed string.

In some situations where A and B are two distrustful parties, it may be necessary for the parties to learn whether two documents which are possessed by the respective parties are the same or substantially the same. For example, B may claim to have a copy of A's secret document and A's course of action may hinge on whether B's claim is true. Neither party however can disclose their respective document to the other in order to verify B's claim without destroying their secrecy. While the use of zero-knowledge protocols is known for exchanging secret keys it has not been used for comparing documents.

There is a need therefore a strong zero-knowledge document comparison method between mutually distrustful parties.

DISCLOSURE OF INVENTION

The present invention therefore provides a method of securely comparing a first document in possession of a first party and a second document in possession of a second party, without revealing the contents of the first document to the second party or the contents of the second document to the first party, said method comprising the steps of:

i) said first and second parties each generating its own set of random data;
ii) each party exchanging the set of random data and a shared hash function with the other party;
iii) each party computing a first value consisting of the output of the shared hash function where the input to the hash function is the consecutive concatenation of the document in each party's possession, followed by that party's set of random data, followed by the other party's set of random data;
iv) each party computing a second value consisting of the output of the shared hash function where the input to the hash function is the consecutive concatenation of the document in each party's possession, followed by the other party's set of random data, followed by that party's set of random data;
v) each party sending its first value to the other party and receiving the other party's first value; and
vi) each party comparing the other party's first value to its second value;
vii) each party concluding that if the values are the same, then the two documents are the same, but that otherwise the two documents are different.

The invention further provides a computer program product and an article for carrying out the method.

BRIEF DESCRIPTION OF DRAWINGS

In drawings which disclose a preferred embodiment of the invention.

BEST MODE(S) FOR CARRYING OUT THE INVENTION

Figure 1:
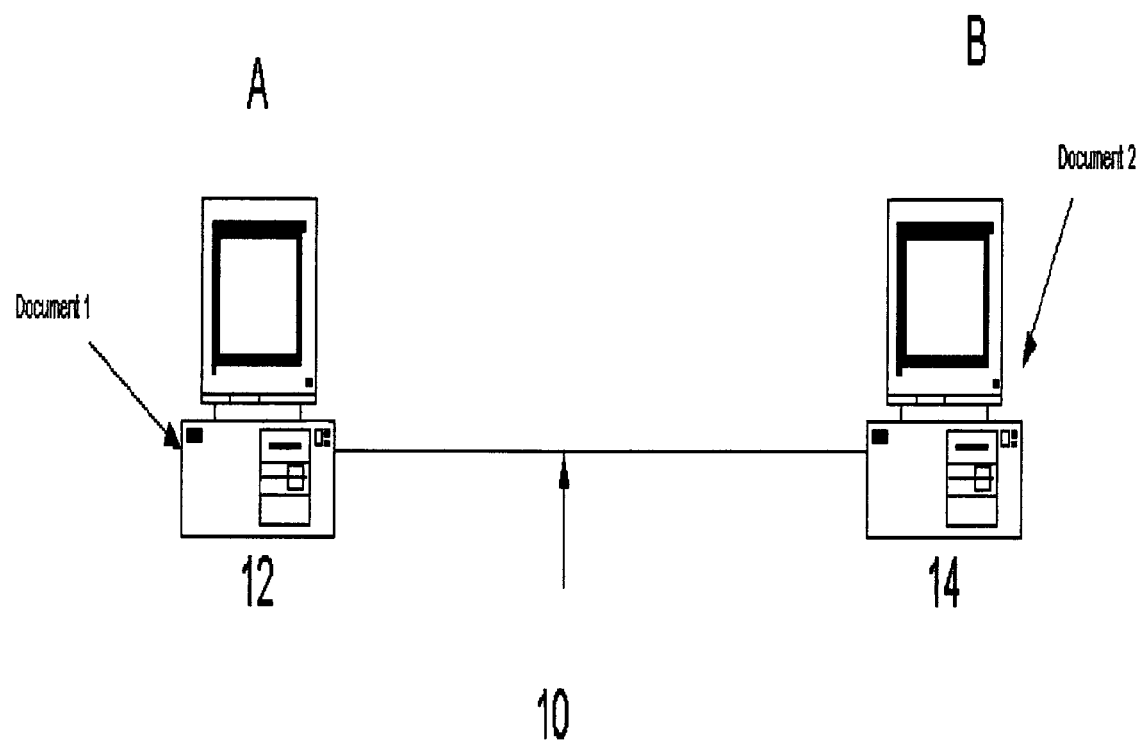
FIG. 1 is a schematic illustration of a computer network according to the present invention.
Figure 2:
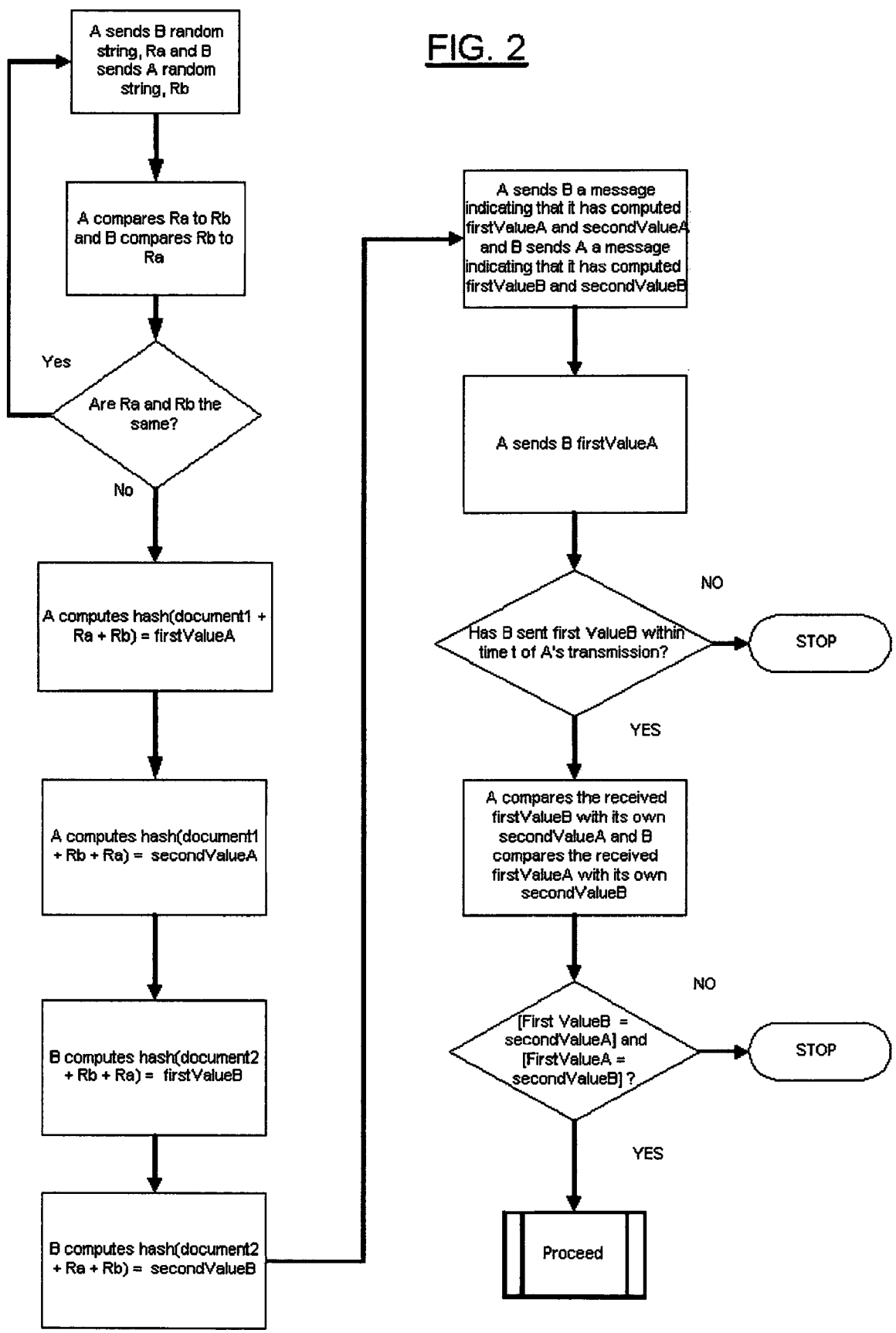
FIG. 2 is a flow chart illustrating the method of the invention.

With reference to FIG. 1, a communications link, such as a computer network, is designated generally as 10. Parties A and B, who distrust each other, communicate between their respective computers 12 and 14, which have central processors and are capable of generating random numbers, and comparing numbers. A possesses a document containing information, in electronic form or otherwise, referred to as document1. B possesses a document containing information, in electronic form or otherwise, referred to as document2. Parties A and/or B, would like to take some further action only if one or the other or both can be assured that they both have the same document. They may not care to know each other's identity.

If the respective documents, document1 and document2, are not already in the form of a bit string, they are scanned or otherwise converted to that format. Next, A sends B a collection of random bits, Ra, preferably incorporating a timestamp. B sends A a collection of random bits, Rb, preferably incorporating a timestamp. A compares Ra to Rb and aborts the comparison if they are the same, since the comparison will only work if the random numbers generated by A and B are different. Similarly B compares Rb to Ra and aborts the comparison if they are the same. They will then restart and generate fresh random numbers if they wish to continue.

Once A and B have exchanged non-identical random strings Ra and Rb, and have agreed on one-way hash functions $H_1$, $H_2$, A computes firstValueA by concatenating document1 with Ra and Rb, in that order, to form a string document1+Ra+Rb, in that order and then applying to that string a one-way hash function $H_1$. Any suitable cryptographic one-way hash function, such as the SHA-1 function, may be used. A then computes secondValueA by concatenating document1+Rb+Ra, in that order, and applying to it one-way hash function $H_2$. Similarly B computes firstValueB by concatenating document2 with Rb and Ra, in that order, to form a string document2+Rb+Ra, in that order, and then applying to that string one-way hash function $H_2$. B then computes secondValueB by concatenating document2 with Ra and Rb, in that order, to form a string document2+Ra+Rb, in that order, and then applying to that string a one-way hash function $H_1$. Hash functions $H_1$ and $H_2$ may be the same.

It has been agreed upon beforehand that A will transmit the encrypted string firstValueA first to B, although the method will work regardless of which party sends the encrypted string to the other first. Upon completion of the foregoing steps, A sends B a message indicating that it has computed firstValueA and secondValueA, and either before, after, or at the same time as A sends that message, B sends A a message indicating that it has computed firstValueB and secondValueB. A then sends B firstValueA. B sends A firstValueB immediately upon receipt of A's firstValueA. If A does not receive B's firstValueB within a few milliseconds (in the absence of some other explanation such as a communication breakdown), A knows B did not have the same document and is trying to gain an advantage over A.

If A receives B's firstValueB in a timely way, A compares the received firstValueB with its own secondValueA. B also compares the received firstValueA with its own secondValueB. If the comparisons fail, then A and B know they statistically have different documents, and if the comparison does not fail, then statistically they have the same document. With that knowledge they may then proceed with their intended actions, or not.

Such comparisons may allow for a certain statistical dissimilarity in the strings or range of equivalence. A strict application of a hash function such as SHA-1 to a bit stream, such as a document, will produce a value that is statistically impossible to produce by supplying a second different meaningful bit stream. A strict application of the hash function does not allow for variance resulting from transmission errors or conversion between formats. Such variances would typically result in different hash codes. However, it is possible to describe a process where minor variation in the source can be handled. A document may be normalized before being passed to a hash function, or a hash function could be constructed that handles the normalization internally as part of the implementation. In this way inconsequential differences in the documents such as case type and spacing can be ignored.

For example, the parties could agree that whitespace (such as spaces, tabs and carriage returns) and character case are insignificant. The document could then be converted to a normalized form where there is no whitespace and all the characters are lowercase. The other approach would be to make the hash function ignore whitespace and change characters to lowercase before injection into the rest of the algorithm.

Thus it will be seen that according to this method, A and/or B cannot prove anything to a third party without revealing documents. A and B do not exchange the actual documents or hashed documents. Further, A or B cannot fool another party C into thinking it has the document by mirroring, resending or replaying the hash received from the other party to the third party. B cannot assert computational delay as they have previously asserted a pre-computation.

The present invention is described above as a computer-implemented method. It may also be embodied as a computer hardware apparatus, computer software code or a combination of same. The invention may also be embodied as a computer-readable storage medium embodying code for implementing the invention. Such storage medium may be magnetic or optical, hard or floppy disk, CD-ROM, firmware or other storage media. The invention may also be embodied on a computer readable modulated carrier signal.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

The embodiments of the invention in which an exclusive property or privilege is claimed are defined as follows:

I claim:

1. A method of securely comparing a first document in possession of a first party and a second document in possession of a second party, without revealing the contents of the first document to the second party or the contents of the second document to the first party, said method comprising the steps of:
   i) said first and second parties each generating its own set of random data;
   ii) each party exchanging said set of random data and a shared hash function with the other party;
   iii) each party computing a first value consisting of the output of said shared hash function where the input to the hash function is the consecutive concatenation of the document in each said party's possession, followed by that party's set of random data, followed by the other party's set of random data;
   iv) each party computing a second value consisting of the output of said shared hash function where the input to the hash function is the consecutive concatenation of the document in each said party's possession, followed by the other party's set of random data, followed by that party's set of random data;
   v) each party sending its first value to the other party and receiving the other party's first value;
   vi) each party comparing said other party's first value to its second value;
   vii) each party concluding that if the said values are the same, then the two documents are the same, but that otherwise said two documents are different;
   viii) after computing said first and second values according to steps iii) and iv) above, each said first and second parties sending confirmation to the other party that each said party's first and second values have been computed, and waiting for said confirmation from said other party that each said party's first and second values have been computed before proceeding;
   ix) after one party has sent its first value to the other party according to step v) above, aborting the comparison if the other party does not respond with its first value within a pre-determined length of time;
   x) after step i) and before step ii), each party examining the other party's set of random data for suitability and aborting the comparison if suitability is not established, wherein said other party's random data is determined to be unsuitable if it is identical to said examining party's set of random data.

* * * * *